United States Patent [19]
Ohler et al.

[11] Patent Number: 5,212,790
[45] Date of Patent: May 18, 1993

[54] METHOD OF PROGRAMMING A TASK, HAVING A PLURALITY OF PROCESSES, CREATED BY A PLURALITY OF DIFFERENT PROGRAMMERS, FOR OPERATION BY A COMPUTER

[75] Inventors: Peter C. Ohler, Lafayette; Michael A. Curry, Berkeley, both of Calif.

[73] Assignee: Tcknekron Communications Systems, Inc., Berkeley, Calif.

[21] Appl. No.: 619,217

[22] Filed: Nov. 28, 1990

[51] Int. Cl.$^5$ .............................................. G06F 9/06
[52] U.S. Cl. ............................ 395/650; 364/DIG. 1; 364/281.3
[58] Field of Search ............... 364/DIG. 1, DIG. 2; 395/650

[56] References Cited

U.S. PATENT DOCUMENTS

| | | | |
|---|---|---|---|
| 4,394,725 | 7/1983 | Biennenu et al. | 364/DIG. 1 |
| 4,447,874 | 5/1984 | Bradley et al. | 364/DIG. 1 |
| 4,500,960 | 2/1985 | Babecki et al. | 364/DIG. 1 |
| 4,692,861 | 9/1987 | May | 364/DIG. 1 |
| 4,733,347 | 3/1988 | Fukuoka | 364/DIG. 1 |
| 4,949,255 | 8/1990 | Gerth et al. | 364/DIG. 1 |

*Primary Examiner*—Thomas M. Heckler
*Attorney, Agent, or Firm*—Limbach & Limbach

[57] ABSTRACT

In the present invention, a method of programming a task by different programmers for operation by computers is disclosed. The task is divided into a plurality of processes with each process being programmed by a different programmer. A plurality of unique objects is defined for each process. One or more phantom objects are created in a process for use by that process (calling process), wherein upon access by the calling process, the phantom object communicates with the process (called process) having the defined object associated with the phantom object. The defined object is then accessed by the called process and the result is communicated back to the phantom object to the calling process.

6 Claims, 1 Drawing Sheet

METHOD OF PROGRAMMING A TASK, HAVING A PLURALITY OF PROCESSES, CREATED BY A PLURALITY OF DIFFERENT PROGRAMMERS, FOR OPERATION BY A COMPUTER

TECHNICAL FIELD

The present invention relates to a method of creating a program, comprising a plurality of processes, generated by a plurality of different programmers. The present invention also relates to the method of operating such a program.

BACKGROUND OF THE INVENTION

Object programming is well known in the art. In object programming, objects are created by a program operating under the control of a computer. An object is a data structure having procedures attached to it wherein the data is operated upon by the procedure. Each object has a unique identifier, such as a name, and a location in memory where the object is located. When an object is called or accessed by a process, a message is sent to the object and is executed by the object.

In the prior art, a method of programming a task for operating by a computer has been accomplished by dividing the task into a plurality of processes. The processes are assigned to be programmed by a plurality of different programmers. Each of the processes is defined to contain a plurality of unique objects. However, in the event a certain process ("calling process") requires access to an object which is not located within the addressable memory of the calling process, the programmer for the calling process recreates, i.e. defines, that object within the calling process. This has created several problems. First, as programs evolve and change, identically named objects in different processes, may be different—even though they are supposed to be the same. Secondly, in the event processes with the same named objects are combined, i.e. the boundaries of the processes are removed or changed, this results in a process with two identically named objects in two different locations of memory.

SUMMARY OF THE INVENTION

In the present invention a method of programming a task for operation by a computer is disclosed. The task is divided into a plurality of processes. A plurality of unique objects is defined for each process. One or more phantom objects are created in a process for use by that process, wherein upon access by that process, the phantom object communicates with the process having the defined object to cause the defined object to be accessed.

DETAILED DESCRIPTION OF THE DRAWINGS

Figure 1:
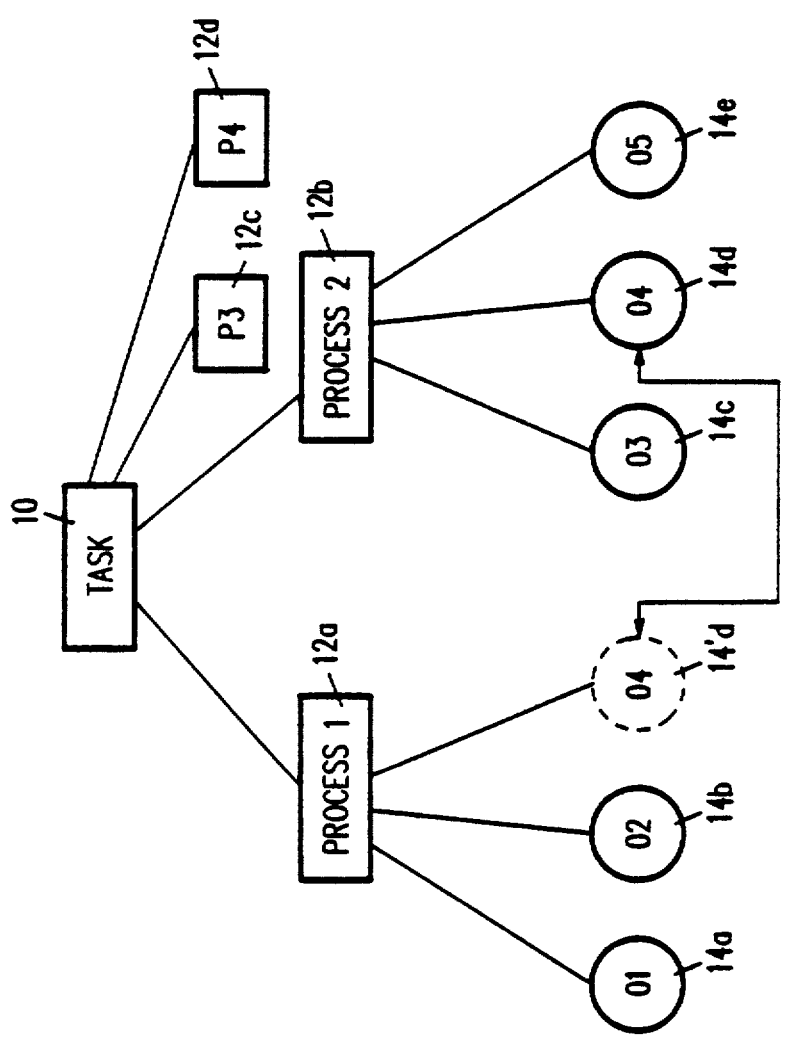
FIG. 1 is the figure of drawing showing the method of the present invention.

Referring to the figure, there is shown a schematic drawing of the method of the present invention. In the present invention, a task 10 to be programmed is shown. The task 10 is to be operated upon by a computer. The task is divided into a plurality of processes 12($a$ ... $d$). Each of the processes 12($a$ ... $d$) is assigned to a different human being programmer to be programmed for execution under the computer.

As is well known in object programming, a plurality of unique objects is defined for each process 12($a$ ... $d$). Thus, for process #1, object #1 and object #2 are uniquely defined. For process #2, object #3, #4, and #5 are uniquely defined for process #2.

In the event the programmer for process #1 wishes to access an object, e.g. object #4 which is uniquely defined in process #2, the programmer creates a phantom object 14'$d$ within process #1. As will be seen, during execution of the process 12$a$, a phantom object 14'$d$ behaves differently from a conventional object 14$a$. The phantom object 14'$d$ is linked to the real object 14$d$ through process #2. The phantom object 14'$d$ knows the location in memory of the real object 14$d$ to which it corresponds.

Once the processes 12($a$ ... $d$) have been programmed by the various different programmers, they are executed. In the execution of the different processes, in the event process #1 accesses or calls upon object #1 14$a$, a message is sent by process #1 to object #1. The object #1 receives that message and executes that message in accordance with the procedure attached thereto.

Similarly, when process #1 accesses phantom object #4 14'$d$, a message is sent to real object #4 14$d$. However, unlike the real object 14$a$, (which is a conventional object) phantom object #4 14'$d$, instead of executing the message sent from process #1 12$a$, seeks out process #2 and causes process #2 to access the real object #4 14$d$ in the memory location specified by the phantom object 14'$d$. When real object #4 14$d$ receives the message from phantom object #4 14'$d$, real object #4 14$d$ executes that message pursuant to the procedure attached thereto. The result of execution of that message is then transferred back to phantom object #4 14'$d$ back into process #1 and then communicated to process #1.

In the preferred embodiment, the creation of a phantom object 14'$d$ is accomplished by the use of a library routine. Attached herewith as Exhibit A is a listing of a computer program written in the CFlavors language (a library for the C language available from Teknekron Communications Systems, Inc. of Berkeley, Calif.). CFlavors is a C library for the C language that resolves variable names at run time. Although CFlavors library is used, any other object oriented language can be used. These include, but are not limited to, LISP, C, CLOS (Common Lisp Object System).

The computer program set forth on Exhibit A has sections that perform the following functions:

1. These files, client.c and server.c, describe the method of the present invention.

2. In the client.c file, this initializes the communications package.

3. This creates the different classes by the same names.

4. This creates a martian named Charlie, where martian is a type of object and Charlie is one particular object within the martian objects.

5. This registers the method with the phantom library. It allows messages to be carried by the phantom object across the interface boundary between processes.

6. This is the function that is called after the object of martian takes a drink.

7. Since these are no longer needed they are removed.

8. These lines of code evidences some more use of callbacks to look at more of the returned values from the martian object.

9. These lines of code create a water object.

10. This sets the values for the water object.

11. This creates a glass object.

12. This puts the water object in the glass object.

13. This is a callback which is called after the martian object in the "server" process is done.

14. This commences the process.

15. This initializes the communication package.

16. This creates all the classes.

17. This creates a callback. This is executed after cbProvide ( ) is called on line 18.

18. This makes Charlie the first message to the callback.

19. The phantom is made. After it is made, the callback is executed and feed_martian is called. The object in the "server" process with the name "Charlie" is found and a phantom object is created for it. It is the phantom object that is used as the second message to the feed_martian function. The phantom object could be used later but in this example it is not used again.

There are a number of advantages to the method of the present invention. First and foremost, with the method of the present invention, the uniquely defined objects are never defined more than once. Thus, debugging is greatly facilitated. For example, any change to a uniquely defined object will cause the same change throughout all the different processes created by different programmers. Programmers in other processes which also use the uniquely defined objects need not be concerned with the definition of the object or of any change to the definition. Thus, for example, if real object #4 14d were changed, that change automatically flows to phantom object 14'd and the programming process #1 does not have to be concerned with the changes to the real object #4 14d.

In addition, the method of the present invention has the advantage of being flexible so that the object can be placed in any of the processes without a change in the code. Thus, objects in one process can be moved to another process, across the process boundary, without changes in the code. For example, if process #2 had additional lines of code requiring access to object #4, those lines of code can be moved into process #1 without changing the lines of code because object #4 is also defined in process #1 (albeit, the action of object #4 in its execution is entirely different from object #4 14d in execution in process #2).

Thirdly, the process boundary itself can be moved to maximize efficiency. The boundary for process #2 can be moved to encompass lines of code that were heretofore used in process #1 thereby changing the process boundary to maximize the efficiency of each of the processes. The movement of the process boundaries would require minimal rewriting of the lines of code.

Fourthly, the method of the present invention can be used to exchange data between processes.

Finally, with the method of the present invention, the development process is much easier when many of the separate processes are developed by different programmers. Each of the process can be developed in modular fashion and placed together with minimal changes in lines of code.

EXHIBIT A

```
* This sample program demonstrates the style of programming
* with libskel, libphantom.
*
* The program needs to be run as two separate processes in order
* to demonstrate phantom functions.
*
* Files:
* main.c  - defines functions required by libskel, setup connection
*           to remote process.
*
* glass.c - defines the glass flavor
*           Flavor Glass is glass.
*           Instance Variable:
*                   Instance *content - content of the glass.
*
* liquid.c - defines the liquid flavor
*            Flavor Liquid
*            Instance Variable:
*                    double *weight - weight of liquid in liter.
*                    char *type - type of liquid, e.g. water
*
* martian.c - defines the martian flavor
*             Flavor Martian
*             Instance Variable:
*                     char *name - name of the Martian
*             Methods:
*                     drink - drinks a glass of water
*
```

```
 * client.c - contains the client driver. It does the followings:
 *              1. creates a phantom to connect to the server.
 *              2. creates an instance of Glass
 *              3. creates an instance of water(Liquid)
 *              4. pours water into the glass
 *              5. sends the glass to the martian
 *
 * server.c - contains the server driver. It does the followings:
 *              1. defines a principal object. The principal accepts
 *                 actions from other processes.
 *              2. sits and listens to new requests from clients.
 */
include <stdio.h>
#include <ctype.h>

/*
 * Usage string
 */
char USAGE[] = "usage: %s [ -s ] [ -p name ]\n";

extern char     *program;       /* name of the running program */ int             isserver = 1;   /* default to server */

Init(argc, argv)
        char    *argv[];
{
        register char   *ap;

/* parse command line arguments */
        while (--argc > 0 && *++argv != NULL) {
                if (**argv == '-' && *(*argv + 1) != '\0') {
                        for (ap = ++*argv; *ap != '\0'; ap++) {
                                switch (*ap) {
                                case 'c':
                                        isserver = 0;
                                        break;

/* add cases for other options ... */
                                default:
                                        Usage(NULL);
                                        return (-1);
                                }
                        }
                } else {
                        Usage(NULL);
                        return (-1);
                }
        }

/* initialize types */
        typeInit();

/* initialize the phantom */
        if (phantInit() < 0) {
                skelError("phantomInit failed!\n");
                exit(1);
        } if (isserver) {
                if (server() < 0)               /* setup the server */
                        return (-1);
        } else {
                if (client() < 0)               /* setup the client */
                        return (-1);
        }

/* start up the world */
        skelMainLoop();
```

```
            /* return of Init() cleans up and exits */
            return (0);
}

Usage(str)
            char *str;
{
            extern char     *skelUsage();

skelError(USAGE, program);
} void
CleanUp(sig)
            int      sig;
{
            if (sig > 0)
                    skelError("Got signal %d; cleaning up...\n", sig);

skelLog("application exiting.");

exit(sig);
}
/*
 * server.c
 *
 * server does the followings:
 *
 *      1. create a martian call charlie
 *      2. wait for some clients to feed it.
 */
include <stdio.h>
include <cflavors.h>
#include "internal.h"

extern Instance *InitApProcess();

server()
{
            Instance        *charlie;
            Instance        *client;

if (_Chain() == NULL)
                    exit(1);

if ((client = InitApProcess("client")) == NULL) {           ⎫ ②
                    skelError("Can't contact remote server!\n");        ⎬
                    exit(1);                                            ⎭
            } if (_Liquid() == NULL || _Glass() == NULL || _Martian() == NULL) {  ⎫ ③
                    exit(1);                                                    ⎬
            }                                                                   ⎭ if ((charlie = cfMakeInstance(Martian_, NO_INIT)) == NULL) {        ⎫ ④
                    skelError("Can't find a Martian in this plant!\n");         ⎬
                    exit(1);                                                    ⎭
            }

*(char **) cfQuickGetVar(charlie, name_) = "charlie";
            cfSend(charlie, init_);

cfSend(charlie, declare_methods_);       ⎫ ⑤ fprintf(stderr, "Martian charlie waiting for some drinks\n");
            return (0);
}
```

```
/*
 * client.c
 *
 * client does the followings:
 *
 *      1. create an instance of liquid (water)
 *      2. create an instance of glass
 *      3. pour water in the glass
 *      4. creates an instance of Martian phantom.
 *      5. waits for the connection to establish and send
 *         the martian a drink.
 */ include <stdio.h>
include <cflavors.h>
#include <callback.h>
#include <mumble.h>
#include <ap.h>
#include "internal.h"

martian_reply(number, string, potpourri, real)
        int             number;
        char            *string;
        double          real;
        Potpourri       *potpourri;
{
        /* print it */
        printf("principal replied:\n");
        printf("pi = %lf, ten = %d, string = \"%s\"\n",
                real, number, string);
#ifdef use_potpourri
        printf("potpourri = { %d %lf }\n",
                potpourri->number, potpourri->real);
#endif
} martian_finished(self, glass, water, martian, response)
        Instance        *self;
        Instance        *glass;
        Instance        *water;
        char            *martian;
        Instance        *response;
{
        asyncCallback   *cback;
        static Mval     ret;
        Mval            atom;
        static Potpourri potpourri = { 100, 3.1415926 };

cfSend(water, kill_);
        cfSend(glass, kill_);
/*      fprintf(stdout, "%s: %s\n", martian, response); */
{
        while (response != NULL) {
                fprintf(stdout, "chain %d received!\n",
                        *(int *) cfQuickGetVar(response, chain_no_));
                response = *(Instance **) cfQuickGetVar(response, next_);
        }
}

/* chat with the martian */
        cback = cbFunctionCB(martian_reply, 0,
                        CB_WORDS(double) +
                        CB_WORDS(int) +
#ifdef use_potpourri
                        CB_WORDS(Potpourri*) +
#endif
                        CB_WORDS(char*));
        cfSend(self, gibberish_, 3.1415, 10, "string", &potpourri, cback);
}
```

```
feed_martian(martian_name, martian)
        char            *martian_name;
        Instance        *martian;
{
        asyncCallback   *cback;
        Instance        *water;
        Instance        *glass;

/* get a glass and some water */
        if ((water = cfMakeInstance(Liquid_, NO_INIT)) == NULL) {
                skelError("No more water available!\n");
                exit(1);
        }
        *(char **) cfQuickGetVar(water, type_) = "water";
        *(double *) cfQuickGetVar(water, weight_) = 1.2;
        cfSend(water, init_);

if ((glass = cfMakeInstance(Glass_, INIT)) == NULL) {
                skelError("Can't make any glasses!\n");
                exit(1);
        }
        cfSend(glass, set_color_, "red");
        cfSend(glass, init_);

/* Put something in the glass */
        cfSend(glass, pour_, water);

/* Send drink message to martian with callback */
        cback = cbFunctionCB(martian_finished,
                        CB_WORDS(Instance*) +
                        CB_WORDS(Instance*) +
                        CB_WORDS(Instance*) +
                        CB_WORDS(char*),
                        CB_WORDS(Instance*));
        cbProvide(cback, martian, glass, water, martian_name);
        cfSend(martian, drink_, glass, cback);
} client()
{
        asyncCallback   *cback;
        Instance        *server;

if ((server = InitApProcess("server")) == NULL) {
                skelError("Can't contact remote server!\n");
                exit(1);
        } if (_Liquid() == NULL || _Glass() == NULL || _Martian() == NULL)
                exit(1);
        if (_Chain() == NULL)
                exit(1);

/* setup phantom */
        if ((cback = cbFunctionCB(feed_martian, CB_WORDS(char*),
                        CB_WORDS(Instance*))) == NULL) {
                skelError("Can't find a Martian in this plant!\n");
                exit(1);
        }
        cbProvide(cback, charlie_);

if (phantMakePhantomByNum("server", Martian_, 1, cback) < 0) {
                skelError("Can't find a Martian in this plant!\n");
                exit(1);
        } return (0);
}
```

What is claimed is:

1. A method of programming a task in object program format by a user for operation by a computer, comprising the steps of:
dividing said task into a plurality of processes by the user;
defining a plurality of unique objects for each process by the user; and
creating one or more phantom objects by the computer in a first process in response to a command specified by the user, each of said phantom objects corresponds to a defined object in a second different process, wherein upon access to a phantom object by the computer executing said first process, said computer automatically links with the second process having the corresponding defined object to cause said corresponding defined object to be accessed.

2. The method of claim 1 wherein the plurality of unique objects for each process are defined by a different human being.

3. A method of executing an object program operating under the control of a computer, said program having a plurality of processes programmed by a user, said method of executing said program being independent of the boundaries of said processes, comprising the steps of:
defining a plurality of unique objects for each process by the user;
creating one or more phantom objects by the computer in response to a command specified by the user in one process for use by said one process, each of said phantom objects corresponds to a defined object in another process;
accessing said phantom object in said one process by the computer;
linking by the computer through the phantom object of one process to the corresponding defined object in another process;
accessing said corresponding defined object in said another process by the computer through the phantom object; and
transferring the result of said accessing by said phantom object, to said one process by the computer.

4. The method of claim 3 wherein each of said processes is programmed by a different human being.

5. A method of creating an object program by a user for execution by a computer, comprising the steps of:
dividing said program into a plurality of sub-programs by the user;
defining a plurality of unique objects for each sub-program by the user;
creating one or more phantom objects in one process for use by said one process by the computer, in response to a command specified by the user, each of said phantom objects corresponds to a defined object in another process; and
causing each of said phantom objects to link automatically with another process having the corresponding defined object, to cause said one process to access said corresponding defined object automatically and to return the results of said execution to said one process automatically, by the computer.

6. The method of claim 5 wherein each of said sub-programs is programmed by a different human being.

* * * * *